(12) United States Patent
Peeler et al.

(10) Patent No.: US 7,442,441 B2
(45) Date of Patent: Oct. 28, 2008

(54) COMPOSITE STRUCTURE, A RESIN COMPOSITION FOR USE IN THE COMPOSITE STRUCTURE, AND A PROCESS FOR MAKING THE SAME

(75) Inventors: Calvin T. Peeler, Canton, MI (US); Aaron M. Rath, Ypsilanti, MI (US); Heinz Plaumann, Flat Rock, MI (US); James F. Turnbach, Troy, MI (US)

(73) Assignee: BASF Corporation, Florham Park, NJ (US)

( * ) Notice: Subject to any disclaimer, the term of this patent is extended or adjusted under 35 U.S.C. 154(b) by 159 days.

(21) Appl. No.: 10/834,652

(22) Filed: Apr. 29, 2004

(65) Prior Publication Data

US 2005/0244653 A1    Nov. 3, 2005

(51) Int. Cl.
*B32B 27/36* (2006.01)
*B05D 1/36* (2006.01)

(52) U.S. Cl. .................................. 428/423.7; 427/407.1
(58) Field of Classification Search .............. 428/423.1, 428/423.7; 427/407.1
See application file for complete search history.

(56) References Cited

U.S. PATENT DOCUMENTS

| | | | |
|---|---|---|---|
| 3,769,244 A | * | 10/1973 | Hashimoto et al. .......... 521/129 |
| 5,208,269 A | | 5/1993 | Brown |
| 5,290,602 A | * | 3/1994 | Argyropoulos et al. ..... 427/422 |
| 5,478,494 A | * | 12/1995 | Lee et al. ................ 252/182.25 |
| 5,482,648 A | | 1/1996 | Borden et al. |
| 2002/0026078 A1 | | 2/2002 | Tokumoto et al. |

FOREIGN PATENT DOCUMENTS

EP    0379246    8/1994

* cited by examiner

*Primary Examiner*—Thao T. Tran
(74) *Attorney, Agent, or Firm*—Fernando A. Borrego; Howard & Howard

(57) ABSTRACT

The subject invention discloses a composite structure and a resin component for use in the composite structure. The composite structure includes a first layer, comprising a styrenated unsaturated polyester, and a second layer. The first layer is a show surface of the composite structure. The second layer includes the reaction product of the resin component and an isocyanate component. The resin component includes an isocyanate-reactive component, an amine-based catalyst, and a temperature-activated catalyst that is different from the amine-based catalyst. The amine-based catalyst is active at ambient temperature for initiating an exothermic reaction between the isocyanate component and the resin component thereby establishing a reaction temperature greater than the ambient temperature. The temperature-activated catalyst is active at the reaction temperature for completing a cure of the isocyanate component with the resin component.

40 Claims, No Drawings

COMPOSITE STRUCTURE, A RESIN COMPOSITION FOR USE IN THE COMPOSITE STRUCTURE, AND A PROCESS FOR MAKING THE SAME

FIELD OF THE INVENTION

The present invention generally relates to a composite structure, a resin component for use in the composite structure, and a process for making the composite structure. The composite structure includes a first layer, which is a show surface of the composite structure, and a second layer. The first layer of the composite structure includes a styrenated unsaturated polyester, and the second layer is the reaction product of an isocyanate component and the resin component. The composite structure is primarily utilized in boats, tonneau covers, and automotive parts.

BACKGROUND OF THE INVENTION

Use of composite structures throughout the boat, tonneau cover, and automotive parts industries is known in the art. As is also known in the art, prior art composite structures include those having a first layer, or show surface, commonly referred to as a styrenated unsaturated polyester layer, and a second layer, commonly referred to as a styrenated unsaturated polyester resin backing layer. The backing layer functions to provide support and durability to the complete composite article.

It is also known in the art that, during application of the first and second layers to a mold substrate, large quantities of styrene monomer, which is considered a volatile organic compounds (VOC), are emitted. The emission of VOCs is undesirable for environmental, health, and safety reasons. As a result of the quantities of styrene monomers associated with the composite structures of the prior art, the industry has sought to eliminate certain layers in the composite structures that include styrene.

In response to the need outlined above, the industry is moving toward composite structures that have the same first layer described above but a different second layer. This different second layer is a polyurethane or polyurea backing layer that is the reaction product of an isocyanate component with a resin component. The resin component includes a polyol or polyamine and a catalyst. However, the composite articles of the prior art that already include a polyurethane or polyurea backing layer as the second layer are deficient for various reasons.

Generally, the polyurethane and polyurea backing layers of the prior art, when used in combination with a styrenated unsaturated polyester layer, "set-up" or react too quickly. For instance, when the backing layer, i.e., the polyurethane or polyurea layer, is applied to the first layer, i.e., to the styrenated unsaturated polyester layer, cross-linking is necessary between the polyurethane or polyurea backing layer and the styrenated unsaturated polyester layer for adhering the backing layer to the first layer. The polyurethane and polyurea backing layers do not sufficiently cross-link with the styrenated unsaturated polyester layer when the reaction is too quick. Ultimately, the bond between the polyurethane or polyurea backing layer and the styrenated unsaturated polyester layer is unacceptable because there is insufficient cross-linking between the layers.

In the prior art, the various components of the backing layer have been adjusted to increase the reaction time by adding an imidazole-based catalyst to the resin component. However, the composite structures resulting from the slower reactivity exhibit insufficient resistance to heat distortion for the above mentioned applications.

U.S. Pat. No. 5,482,648 to Borden et al. (the '648 patent) focuses on minimizing blistering in a resultant composite structure, and includes the catalyst system to ensure reaction of all functional components of the isocyanate and polyol components. More specifically, the '648 patent discloses a catalyst system including a first and a second peroxy-based compound for use in production of a polyurethane system. The first peroxy-based compound is active at room temperature and the second peroxy-based compound is active at a temperature of at least 167° F. The second peroxy-based compound is activated by an exothermic reaction resulting from the first peroxy-based compound catalyzing a reaction between isocyanate and polyol components. However, the isocyanate-reactive components and catalysts are not optimized to achieve sufficient cross-linking density necessary to result in resistance to heat distortion, as indicated through heat distortion temperatures, consistent with the subject invention.

The catalyst system of the '648 patent would not work with the composite structure of the subject invention. Peroxy-based compounds do not sufficiently catalyze the reaction between the isocyanate component and the isocyanate-reactive component of the subject invention and are too slow, given the functionality of the isocyanate-reactive component. Furthermore, the composite structures of the '648 patent do not achieve sufficient cross-linking density to be sufficiently resistant to heat distortion.

The polyurethane and polyurea backing layers of the prior art have not, to date, been optimized for use with styrenated unsaturated polyester layers. More specifically, the resin components have not been optimized for the type of the particular isocyanate-reactive components and catalysts in the backing layer to provide sufficient reaction time of the backing layer and to achieve sufficient cross-linking density, and thus resistance to heat distortion.

Due to the deficiencies in the composite structures of the prior art, including those described above, it is desirable to provide a novel composite structure having a styrenated unsaturated polyester layer backed by a polyurethane or polyurea backing layer that reacts to provide sufficient reaction time for allowing the backing layer to sufficiently cross-link with the styrenated unsaturated polyester layer, yet provides sufficient cross-linking density to render the composite structure sufficiently resistant to heat distortion.

SUMMARY OF THE INVENTION

A composite structure, a resin component for use in the composite structure, and a process for making the composite structure are disclosed. The composite structure of the subject invention includes a first layer and a second layer. The first layer includes a styrenated unsaturated polyester and is a show surface of the composite structure. The second layer includes the reaction product of an isocyanate component and a resin component that is reactive with the isocyanate component at ambient temperature.

The resin component includes an isocyanate-reactive component having a nominal functionality of at least 3, an amine-based catalyst, and a temperature-activated catalyst. The amine-based catalyst is active at ambient temperature. As such, the amine-based catalyst initiates an exothermic reaction between the isocyanate component and the isocyanate-reactive component. The temperature-activated catalyst is different from the amine-based catalyst and is active at a temperature greater than the ambient temperature.

The process for making the composite structure includes providing the first layer that is the show surface of the composite structure and providing the second layer that includes the reaction product of the isocyanate component and the resin component.

The amine-based catalyst provides sufficient reaction time for cross-linking to occur between the first and second layer before the backing layer completely cures. The combination of the functionality of the isocyanate-reactive component and the presence of the temperature-activated catalyst enables the reaction product of the isocyanate component and the resin component to achieve sufficient cross-linking density, which renders the composite structure sufficiently resistant to heat distortion.

DETAILED DESCRIPTION OF A PREFERRED EMBODIMENT

A composite structure according to the subject invention includes a first layer and a second layer. Ultimately, the first layer is a show surface of the composite structure. The second layer is a backing layer for providing support and durability to the first layer of the complete composite structure.

Preferably, the first layer and the second layer are applied to a mold substrate in an open-mold process to form the composite structure. However, it is to be appreciated that the first layer and second layer may be applied in a closed mold to form the composite structure. In the open-mold process, the first layer is first applied to a surface of the mold substrate. The first layer is cured at ambient temperature for about one hour after application to the mold before the second layer is applied. The second layer is then applied to the first layer. The second layer has sufficiently low viscosity to enable spraying and/or pouring of the second layer during production of the composite structure, to be described in further detail below.

In one embodiment, fiber is included in the second layer, and the second layer with the fiber is rolled. In another embodiment, the second layer without fiber is applied thinly to the first layer. Fiber is then applied onto the second layer. The second layer with the fiber is then-rolled. More of the second layer is then applied onto the fiber to complete the composite structure. However, it is to be appreciated that the composite structure may be produced without the fiber. The completed composite structure is then de-molded from the open mold substrate. After application of the first layer and the second layer, and also after the de-molding of the completed composite structure, the first layer is a show surface of the composite structure whereas the second layer is a support or backing layer to the first layer.

The first layer includes a styrenated unsaturated polyester. Preferably, the styrenated unsaturated polyester of the first layer has a nominal styrene content of at least 35 parts by weight based on the total weight of the styrenated unsaturated polyester. In one preferred embodiment, the nominal styrene content of the styrenated unsaturated polyester is 42 parts by weight. The styrenated unsaturated polyester is formed from the reaction of difunctional acids, at least one of which has unsaturation such as maleic acid, and alcohols, typically a glycol diol. The resin resulting from the reaction of difunctional acids and alcohols is dissolved into a monomeric solvent containing vinyl unsaturation. The solvent of choice is usually styrene monomer. One styrenated unsaturated polyester suitable for use in the subject invention is commercially available as Vipel™ F737-FB Series Polyester Resin (formerly E737-FBL) from AOC Resins of Collierville, Tenn.

The second layer includes the reaction product of an isocyanate component and a resin component that is reactive with the isocyanate component. The resin component more specifically includes an isocyanate-reactive component, an amine-based catalyst, and a temperature-activated catalyst that is different from the amine-based catalyst. It is to be appreciated that the reaction between the isocyanate-reactive component and the resin component denotes a reaction between the isocyanate component and the isocyanate-reactive component, catalyzed by the amine-based catalyst and the temperature-activated catalyst.

Preferably, the isocyanate component is selected from the group of diphenylmethane diisocyanate, polymeric diphenylmethane diisocyanate, liquid modified pure diphenylmethane diisocyanate, and combinations thereof. Preferred isocyanate components include, but are not limited to, Elastocast® 70750T, Lupranate® M20S, and Lupranate® MP102, all commercially available from BASF Corporation of Wyandotte, Mich. As alluded to above, the isocyanate component may comprise a combination of isocyanates. That is, a blend of at least two isocyanates may be utilized for reaction with the resin component to form the second layer. In a most preferred embodiment, the isocyanate component includes a blend of polymeric diphenylmethane diisocyanate and liquid modified pure diphenylmethane diisocyanate.

Other suitable isocyanate components include, but are not limited to, conventional aliphatic, cycloaliphatic, araliphatic and aromatic isocyanates. Specific examples include: alkylene diisocyanates with 4 to 12 carbons in the alkylene radical such as 1,12-dodecane diisocyanate, 2-ethyl-1,4-tetramethylene diisocyanate, 2-methyl-1,5-pentamethylene diisocyanate, 1,4-tetramethylene diisocyanate, 1,6-hexamethylene diisocyanate; cycloaliphatic diisocyanates such as 1,3- and 1,4-cyclohexane diisocyanate as well as any mixtures of these isomers, 1-isocyanato-3,3,5-trimethyl-5-isocyanatomethyl-cyclohexane (isophorone diisocyanate), 2,4- and 2,6-hexahydrotoluene diisocyanate as well as the corresponding isomeric mixtures, 4,4'- 2,2'-, and 2,4'-dicyclohexylmethane diisocyanate as well as the corresponding isomeric mixtures, aromatic diisocyanates such as 2,4- and 2,6-toluene diisocyanate and the corresponding isomeric mixtures, 4,4'-, 2,4'-, and 2,2'-diphenylmethane diisocyanate and the corresponding isomeric mixtures, as well as mixtures of any of the aforementioned isocyanate components.

The isocyanate component may also be a pre-polymer. That is, the isocyanate component may be a polyisocyanate initiated pre-polymer including a polyisocyanate. In one embodiment, the isocyanate component also includes a polyol for forming the pre-polymer. Specific examples of suitable polyols include all polyols as set forth below for including in the resin component.

Preferably, the isocyanate component utilized to form the second layer of the subject invention has a NCO content of from 15 to 33.5, more preferably from 20 to 32, parts by weight based on the total weight of the isocyanate component. Preferably, the volume ratio of the isocyanate component to the resin component is from 0.9:1 to 3.5:1. In a more preferred embodiment, the volume ratio is 1:1. The isocyanate component has a nominal isocyanate functionality of from 2 to 3. Such functionalities, in combination with the isocyanate-reactive component and the catalysts, provide for a sufficient cross-linking density in the reaction product of the isocyanate component and the resin component to render the composite structure sufficiently resistant to heat distortion.

As set forth above, the resin component includes an isocyanate-reactive component. The isocyanate-reactive component has a nominal functionality of at least 3 for providing sufficient cross-linking density in the reaction product of the isocyanate component and the isocyanate-reactive component, which renders the composite structure sufficiently resistant to heat distortion, to be further discussed below. By nominal functionality, it is meant that the functionality is based upon the functionality of the initiator molecule, rather than the actual functionality of the polyol after manufacture. Preferably, the isocyanate-reactive component has a nominal functionality of from 4 to 8. In a most preferred embodiment, the isocyanate-reactive component has a nominal functionality of from 4.5 to 7. It is to be understood, however, that the isocyanate-reactive component may include a mixture of isocyanate-reactive components. Such mixtures are possible so long as the overall isocyanate-reactive component have an average nominal function of at least 3.

Many isocyanate-reactive components having a functionality of at least 3 and having a high molecular weight also have a high viscosity, making it difficult to spray the resin component. The viscosity of the resin component may be varied by selecting the isocyanate-reactive components based on number average molecular weight, thus making the resin component easier to spray. More specifically, the number average molecular weight of the isocyanate-reactive component may be selected, based on the nominal functionality of the isocyanate-reactive component, to achieve sufficiently low viscosity of the resin component and enable spraying of the resin component. Preferably, the viscosity of the resin component at 25° C. is from 100 to 3500 centipoise, more preferably from 200 to 1000 centipoise. To achieve such viscosities, the number average molecular weight of the isocyanate-reactive components is preferably from 300 to 2000, more preferably from 300 to 700.

In one embodiment, the isocyanate-reactive component includes a polyol, specific examples of which will be described in further detail below. It is most preferred that the polyol include a propylene oxide cap of 100 parts by weight based on the total weight of the polyol to react relatively slow with the isocyanate component, as compared to polyols having greater amounts of ethylene oxide capping. That is, although the polyol may include some percentage of an ethylene oxide cap, it is most preferred that the percentage of ethylene oxide cap, based on the total weight of the polyol, is zero. Furthermore, polyols having greater amounts of propylene oxide capping are more hydrophilic and exhibit reduced moisture absorption during manufacture of the composite structure, as compared to polyols having greater amounts of ethylene oxide capping.

The isocyanate-reactive component also includes a hydroxyl number, which, like functionality, also affects the cross-linking density of the reaction product if the nominal functionality is greater than 2. Preferably, the isocyanate-reactive component has a hydroxyl number of at least 200 mg KOH/gm. More preferably, the isocyanate-reactive component has a hydroxyl number of from 300 to 900 mg KOH/gm.

Although polyether polyols are preferred, the polyol may be either a polyether polyol or a polyester polyol. The polyol is formed from an initiator compound. Preferred initiators for the polyol include sucrose, glycerin, trimethylol propane (TMP), sorbitol, pentaerythritol, ethylenediamine (EDA), toluenediamine (TDA), and combinations thereof. This includes high-functional polyols that have been co-initiated with the aforementioned initiators plus di- and tri-functional alcohols and polyethers. More generally, the initiator compound comprises tri-, and poly-functional alcohols or polyamines, including primary, secondary, aromatic, and aliphatic amines.

The primary or secondary amines include, for aromatic amine-initiated polyether polyols, the aromatic amines such as aniline, N-alkylphenylene-diamines, 2,6- or 2,4-toluenediamine, vicinal toluenediamines, o-chloro-aniline, p-aminoaniline, 1,5-diaminonaphthalene, methylene dianiline, the various condensation products of aniline and formaldehyde, and the isomeric diaminotoluenes.

For aliphatic amine-initiated polyols, any aliphatic amine, whether branched or unbranched, substituted or unsubstituted, saturated or unsaturated, may be used. These would include, as examples, mono-, di- and tri-alkanolamines; and polyamines, in addition to the ethylene diamine as mentioned above, such as propylene diamine, diethylenetriamine; or 1,3-diaminopropane, 1,3-diaminobutane, and 1,4-diaminobutane. Other initiator compounds are possible so long as the properties for the polyol are satisfied as described above.

Suitable polyols for the resin component include, but are not limited to, polyoxyalkylene polyether polyols, polythioether polyols, polyester amides and polyacetals containing hydroxyl groups, aliphatic polycarbonates containing hydroxyl groups, amine terminated polyoxyalkylene polyethers, polyester polyols, graft dispersion polyols, and combinations thereof. Examples of suitable polyols having a nominal functionality of at least 3 include, but are not limited to, PLURACOL® 240, PLURACOL® 953, PLURACOL® 975, PLURACOL® 726, PLURACOL® 824, PLURACOL® 736, PLURACOL® 355, QUADROL®, PLURACOL® 1135, PLURACOL® TP440, PLURACOL® GP 430, and PLURACOL® GP 730 which are all commercially available from BASF Corporation; Voranol® 360 and Voranol® 370 commercially available from Dow Chemical Corporation of Midland, Mich.; Carpol® GSP 355 commercially available from Carpenter Company of Richmond, Va.; and Silpol 490 commercially available from Arch Chemical Company of Norwalk, Conn. Preferred polyols include PLURACOL® 975, Voranol® 360, Voranol® 370, Silpol® 490, and Carpol® GSP 355.

The isocyanate-reactive component may also include a polyamine so long as an isocyanate prepolymer, as set forth above, is utilized as the isocyanate component.

The amount of isocyanate-reactive component in the resin component also factors into the cross-linking density within the reaction product of the isocyanate component and the resin component. Preferably, the isocyanate-reactive component is present in an amount of from 60 to 99 parts by weight, more preferably from 95 to 98 parts by weight, based on the total weight of the resin component.

The amine-based catalyst, to be described further below, is active at ambient temperature and initiates an exothermic reaction between the isocyanate component and the resin component. Amine-based, as defined herein, includes any compound derived from ammonia by replacement of one or more hydrogens by functional groups, including cyclic molecules such as imidazoles and other examples to be described in further detail below. The ambient temperature, depending on the process and conditions, may range from room temperature of about 70° F. to elevated temperatures of about 110° F.

In a preferred embodiment, the amine-based catalyst is a cyclic amine-based catalyst. In a more preferred embodiment, the amine-based catalyst is an imidazole-based catalyst. The most preferred catalyst is 1-methyl imidazole (NIMA).

Other suitable amine-based catalysts include, but are not limited to, triethylenediamine (IEDA), 3-methoxypropyldimethylamine, tributylamine, dimethylbenzylamine, N-methyl-, N-ethyl-and N-cyclohexylmorpholine, N,N,N'- trimethyl isopropyl propylenediamine, 1,2-dimethylimidazole, 1-azabicylo[3.3.0]octane and preferably 1,4-diazabicylol[2.2.2]octane, and alkanolamine compounds, such as triethanolamine, triisopropanolamine, N-methyl- and N-ethyldiethanolamine and dimethylethanolamine.

As stated above, the amine-based catalyst initiates the exothermic reaction and thus establishes a reaction temperature greater than the ambient temperature. Preferably, the reaction temperature is at least 140° F. More preferably, the reaction temperature is from 140 to 225° F. In a most preferred embodiment, the reaction temperature is from 140 to 170° F. The reaction temperature activates the temperature-activated catalyst, which further cures the second layer such that cross-linking occurs within the second layer.

Preferably, the amine-based catalyst is present in an amount of from 0.1 to 0.5 parts by weight based on the total weight of the resin component for catalyzing the exothermic reaction between the isocyanate component and the resin component. In a preferred embodiment, the amine-based catalyst is present in an amount of about 0.1 parts by weight based on the total weight of the resin component. The amount of amine-based catalyst present in the resin component is optimized to maintain the gel time within the ranges as set forth above to alleviate detrimental impact of the gel time on production economy.

Prior to achieving the reaction temperature, the reaction between the isocyanate component and the resin component is relatively slow. However, once the reaction temperature is achieved and the temperature-activated catalyst becomes active, the reaction between the isocyanate component and the resin component accelerates and the second layer sets up or gels. The amount of amine-based catalyst present in the resin component is optimized to maintain the gel time such that the reaction between the isocyanate component and the resin component is sufficiently quick to alleviate detrimental impact of the gel time on production economy, yet sufficiently slow to achieve the above stated goals. More specifically, the second layer of the composite structure has a gel time of from 3 to 20 minutes, more preferably from 5 to 10 minutes.

As set forth above, the resin component also includes the temperature-activated catalyst. The temperature-activated catalyst is active at the reaction temperature for completing the cure of the isocyanate component with the resin component. Suitable temperature-activated catalysts for reacting at the reaction temperature include, but are not limited to, acid-blocked catalysts. It is to be appreciated that the catalyst may be any known catalyst for reactions between isocyanate components and resin components that is reactive at the reaction temperature. The acid-blocked catalysts are preferably amine-based catalysts, and more preferably catalysts based on 1,8 diaza-bicyclo (5,4,0) undecene-7 commercially available under the names Polycat SA-102, Polycat SA-1, Polycat DBU, Polycat SA-610/65, and Dabco DC-1 from Air Products and Chemicals.

Preferably, the temperature-activated catalyst is present in the resin component in an amount of from 0.02 to 0.1 parts by weight, based on the total weight of the resin component to ensure sufficient cross-linking density in the reaction product of the isocyanate component and the resin component. More preferably, the temperature-activated catalyst is present in an amount of from 0.075 to 0.1 parts by weight, based on the total weight of the resin component.

In certain embodiments, the composite structure may include a fiber for reinforcing and providing support for the composite structure. If included, the fiber is preferably selected from the group of chopped and woven fibers. More specifically, the fiber includes, but is not limited to, fiberglass, carbon fibers, wood fibers, aramid fibers including all aromatic polyamide materials, polymer fibers such as nylon, and combinations thereof. Preferably, the fiber is chopped fiberglass. In one embodiment, the fiber is included in the second layer and is present in an amount from 1 to 50, more preferably from 15 to 35, parts by weight based on the total weight of the second layer.

The resin component may also further comprise an additive or additives. If included, the additive is selected from the group of surfactants, compatibilizing agents, supplemental cross-linking agents, flame retardants, water scavengers, antifoam agents, UV performance enhancers, hindered amine light stabilizers, thixotropic agents (both reactive and non-reactive), chain extenders, colorants, and combinations thereof. Other suitable additives include, but are not limited to, cell regulators, hydrolysis-protection agents, fungistatic and bacteriostatic substances, dispersing agents, adhesion promoters, and appearance enhancing agents. Each of these additives serves a specific function, or functions, within the resin component that are known to those skilled in the art.

Further details on the conventional assistants and additives mentioned above can be obtained from the specialist literature, for example, from the monograph by J. H. Saunders and K. C. Frisch, High Polymers, Volume XVI, Polyurethanes, Parts 1 and 2, Interscience Publishers 1962 and 1964, respectively, or Kunststoff-Handbuch, Polyurethane, Volume VII, Carl-Hanser-Verlag, Munich, Vienna, 1st and 2nd Editions, 1966 and 1983; incorporated herein by reference.

A process for making the composite structure includes providing the first layer, which is the show surface of the composite structure, and providing the second layer, which has been described in detail above.

As a result of the cross-linking density in the reaction product of the isocyanate component and the resin component, the completed composite structure of the subject invention is sufficiently resistant to heat distortion, as indicated through heat distortion temperature of the composite structure. More specifically, the composite structure has a heat distortion temperature of at least 160° F., more preferably at least 164° F., and most preferably from 170° F. to 225° F. when subject to testing according to ASTM D648 under a load of 264 psi. Specific samples are shown in the Examples section below.

The following examples, illustrating the composition of the first layer and the second layer, are intended to illustrate and not to limit the invention. The amounts set forth in these examples are by weight, unless otherwise indicated.

EXAMPLES

The Examples, as shown below, include Control A for purposes of establishing gel times and heat distortion temperatures absent the temperature-activated catalyst. These Examples are included for comparative purposes only. Examples A and B are Examples that were made in accordance with the subject invention.

| Layer | Component | Control A | Ex. A | Ex. B |
|---|---|---|---|---|
| First Layer | Styrenated unsaturated Polyester | 100.00 | 100.00 | 100.00 |
| | Total | 100.00 | 100.00 | 100.00 |
| Second Layer Resin Component | Polyol A | 96.55 | 96.35 | 96.30 |
| | Catalyst A | 0.10 | 0.10 | 0.10 |

-continued

| Layer | Component | Control A | Ex. A | Ex. B |
|---|---|---|---|---|
| | Catalyst B | 0.00 | 0.03 | 0.08 |
| | Additive A | 1.00 | 1.00 | 1.00 |
| | Additive B | 2.00 | 2.00 | 2.00 |
| | Additive C | 0.30 | 0.3 | 0.30 |
| | Additive D | 0.05 | 0.05 | 0.05 |
| | Total | 100.00 | 100.00 | 100.00 |
| Isocyanate Component | Isocyanate A | 30.00 | 29.64 | 29.64 |
| | Isocyanate B | 70.00 | 69.16 | 69.16 |
| | NCO % | 25.48 | 25.48 | 25.48 |
| | Total | 100.00 | 100.00 | 100.00 |
| | Mix Ratio @ 100 Index | 97.85 | 97.80 | 97.80 |
| | Volumetric Ratio (R:T) | 1:1 | 1:1 | 1:1 |
| | Post-Cure @ 160° F., Minutes | 30 | 30 | 30 |
| | Heat Distortion Temperature, ° F. | 155.70 | 161.6 | 164.7 |

Styrenated unsaturated Polyester is Vipel™ F737-FB Series Polyester Resin (formerly E737-FBL).

Polyol A is a sucrose-initiated polyol having a hydroxyl number of from 350-370 mg KOH/gm and a nominal functionality of approximately 4.5. (Carpenter Co.)

Catalyst A is 1-methyl imidazole (NIMA). (BASF Corp.)

Catalyst B is a non-hydrolyzable temperature-activated catalyst based on 1,8 diaza-bicyclo (5,4,0) undecene-7. (Air Products and Chemicals)

Additive A is diethyltoluenediamine. (DETDA)

Additive B is Baylith L powder water scavenger. (UOP LLC)

Additive C is an antifoaming agent. (Dow Chemical Co.)

Additive D is Reactint Blue colorant. (Milliken Co.)

Isocyanate A is a polymeric diphenylmethane diisocyanate (MDI) with a functionality of approximately 2.7 and a NCO content of approximately 31.5 parts by weight. (BASF Corp.)

Isocyanate B is liquid modified pure MDI having a NCO content of approximately 23.0 parts by weight. (BASF Corp.)

The invention has been described in an illustrative manner, and it is to be understood that the terminology which has been used is intended to be in the nature of words of description rather than of limitation. Obviously, many modifications and variations of the present invention are possible in light of the above teachings, and the invention may be practiced otherwise than as specifically described.

What is claimed is:

1. A composite structure comprising:
   (A) a first layer comprising a styrenated unsaturated polyester wherein said first layer is a show surface of said composite structure; and
   (B) a second layer comprising the reaction product of:
      (I) an isocyanate component; and
      (II) a resin component reactive with said isocyanate component at ambient temperature comprising:
         (a) an isocyanate-reactive component having a nominal functionality of at least 3;
         (b) an imidazole-based catalyst active at ambient temperature that initiates an exothermic reaction between said isocyanate component and said isocyanate-reactive component and establishes a reaction temperature greater than ambient temperature; and
         (c) a temperature-activated catalyst different from said imidazole-based catalyst that is activated at the reaction temperature established by said imidazole-based catalyst.

2. A composite structure as set forth in claim 1 wherein said temperature-activated catalyst comprises an acid-blocked catalyst.

3. A composite structure as set forth in claim 2 wherein said acid-blocked catalyst comprises a cyclic amine-based catalyst.

4. A composite structure as set forth in claim 3 wherein said cyclic amine-based catalyst comprises a 1,8 diaza-bicyclo (5,4,0) undecene-7-based catalyst.

5. A composite structure as set forth in claim 1 wherein said temperature-activated catalyst is present in an amount of from 0.02 to 0.1 percent by weight based on the total weight of said resin component.

6. A composite structure as set forth in claim 1 wherein said imidazole-based catalyst is present in an amount of from 0.1 to 0.5 percent by weight based on the total weight of said resin component.

7. A composite structure as set forth in claim 1 wherein said isocyanate component is selected from the group of diphenylmethane diisocyanate, polymeric diphenylmethane diisocyanate, liquid modified pure diphenylmethane diisocyanate, isocyanate prepolymers and combinations thereof.

8. A composite structure as set forth in claim 1 wherein said isocyanate component has an NCO content of from 15 to 33.5 percent by weight based on the total weight of said isocyanate component.

9. A composite structure as set forth in claim 1 wherein said isocyanate-reactive component comprises a polyamine.

10. A composite structure as set forth in claim 1 wherein said isocyanate-reactive component has a nominal functionality of from 4.5 to 7.

11. A composite structure as set forth in claim 1 wherein said isocyanate-reactive component has a hydroxyl number of at least 200 mg KOH/gm.

12. A composite structure as set forth in claim 1 wherein said isocyanate-reactive component is present in an amount of from 60 to 99 percent by weight based on the total weight of said resin component.

13. A composite structure as set forth in claim 1 wherein said isocyanate-reactive component comprises a polyol derived from an initiator selected from the group of sucrose, glycerin, trimethylol propane, sorbitol, pentaerythritol, ethylenediamine and combinations thereof.

14. A composite structure as set forth in claim 1 wherein said second layer further comprises a fiber.

15. A composite structure as set forth in claim 14 wherein said fiber is selected from the group of fiberglass, carbon fibers, wood fibers, aramid fibers, aromatic polyamide materials, polymer fibers such as nylon, and combinations thereof.

16. A composite structure as set forth in claim 1 wherein said second layer further comprises at least one additive selected from the group of surfactants, compatibilizing agents, supplemental cross-linking agents, flame retardants, moisture scavengers, anti-foam agents, UV performance enhancers, hindered amine light stabilizers, pigments, and thixotropic agents.

17. A composite structure as set forth in claim 1 having a heat distortion temperature of at least 164° F.

18. A composite structure as set forth in claim 1 wherein the reaction temperature greater than ambient temperature is at least 140° F.

19. A resin component for reacting with an isocyanate component at ambient temperature, said resin component comprising:
(A) an isocyanate-reactive component having a nominal functionality of at least 3;
(B) an imidazole-based catalyst active at ambient temperature that initiates an exothermic reaction between the isocyanate component and said isocyanate-reactive component and establishes a reaction temperature greater than ambient temperature; and
(C) a temperature-activated catalyst different from said imidazole-based catalyst that is activated at the reaction temperature established by said imidazole-based catalyst.

20. A resin component as set forth in claim 19 wherein said temperature-activated catalyst comprises an acid-blocked catalyst.

21. A resin component as set forth in claim 20 wherein said acid-blocked catalyst comprises a cyclic amine-based catalyst.

22. A resin component as set forth in claim 21 wherein said cyclic amine-based catalyst comprises a 1,8 diaza-bicyclo (5,4,0) undecene-7-based catalyst.

23. A resin component as set forth in claim 19 wherein said temperature-activated catalyst is present in an amount of from 0.02 to 0.1 percent by weight based on the total weight of said resin component.

24. A resin component as set forth in claim 19 wherein said imidazole-based catalyst is present in an amount of from 0.1 to 0.5 percent by weight based on the total weight of said resin component.

25. A resin component as set forth in claim 19 wherein said isocyanate-reactive component has a nominal functionality of from 4.5 to 7.

26. A resin component as set forth in claim 19 wherein said isocyanate-reactive component has a hydroxyl number of at least 200 mg KOH/gm.

27. A resin component as set forth in claim 19 wherein said isocyanate-reactive component is present in an amount of from 60 to 99 percent by weight based on the total weight of said resin component.

28. A resin component as set forth in claim 19 wherein said isocyanate-reactive component comprises a polyol derived from an initiator selected from the group of sucrose, glycerin, trimethylol propane, sorbitol, pentaerythritol, ethylenediamine and combinations thereof.

29. A resin component as set forth in claim 19 further comprising at least one additive selected from the group of surfactants, compatibilizing agents, supplemental cross-linking agents, flame retardants, moisture scavengers, anti-foam agents, UV performance enhancers, hindered amine light stabilizers, pigments, and thixotropic agents.

30. A resin component as set forth in claim 19 wherein the reaction temperature greater than ambient temperature is at least 140° F.

31. A process for making a composite structure comprising the steps of:
(A) providing a first layer comprising a styrenated unsaturated polyester wherein the first layer is a show surface of the composite structure; and
(B) providing a second layer comprising the reaction product of:
(I) an isocyanate component; and
(II) a resin component reactive with the isocyanate component at ambient temperature comprising:
(a) an isocyanate-reactive component having a nominal functionality of at least 3;
(b) an imidazole-based catalyst active at ambient temperature; and
(c) a temperature-activated catalyst different from the imidazole-based catalyst;
wherein the imidazole-based catalyst initiates an exothermic reaction between the isocyanate component and the isocyanate-reactive component and establishes a reaction temperature greater than ambient temperature and wherein the temperature-activated catalyst is activated at the reaction temperature established by the imidazole-based catalyst to complete a cure of the second layer.

32. A process as set forth in claim 31 wherein the temperature-activated catalyst comprises an acid-blocked catalyst.

33. A process as set forth in claim 32 wherein the acid-blocked catalyst comprises a 1,8 diaza-bicyclo (5,4,0) undecene-7-based catalyst.

34. A process as set forth in claim 31 wherein the temperature-activated catalyst is present in an amount of from 0.02 to 0.1 percent by weight based on the total weight of the resin component.

35. A process as set forth in claim 31 wherein the imidazole-based catalyst is present in an amount of from 0.1 to 0.5 percent by weight based on the total weight of the resin component.

36. A process as set forth in claim 31 wherein the isocyanate-reactive component has a nominal functionality of from 4.5 to 7.

37. A process as set forth in claim 31 wherein the isocyanate-reactive component has a hydroxyl number of at least 200 mg KOH/gm.

38. A process as set forth in claim 31 wherein the isocyanate-reactive component is present in an amount of from 60 to 99 percent by weight based on the total weight of the resin component.

39. A process as set forth in claim 31 wherein the isocyanate-reactive component comprises a polyol derived from an initiator selected from the group of sucrose, glycerin, trimethylol propane, sorbitol, pentaerythritol, ethylenediamine and combinations thereof.

40. A process as set forth in claim 31 wherein the reaction temperature greater than ambient temperature is at least 140° F. and the temperature-activated catalyst is activated at the reaction temperature of at least 140° F.

* * * * *